(12) United States Patent
Yamaguchi

(10) Patent No.: US 12,525,834 B2
(45) Date of Patent: Jan. 13, 2026

(54) ROTOR AND ELECTRIC MOTOR

(71) Applicant: Panasonic Intellectual Property Management Co., Ltd., Osaka (JP)

(72) Inventor: Akira Yamaguchi, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 18/559,357

(22) PCT Filed: Apr. 21, 2022

(86) PCT No.: PCT/JP2022/018464
§ 371 (c)(1),
(2) Date: Nov. 7, 2023

(87) PCT Pub. No.: WO2022/244590
PCT Pub. Date: Nov. 24, 2022

(65) Prior Publication Data
US 2024/0235301 A1    Jul. 11, 2024

(30) Foreign Application Priority Data

May 18, 2021  (JP) ................ 2021-083715

(51) Int. Cl.
*H02K 1/30*    (2006.01)
*H02K 1/2733*    (2022.01)
*H02K 21/16*    (2006.01)

(52) U.S. Cl.
CPC ............ *H02K 1/30* (2013.01); *H02K 1/2733* (2013.01); *H02K 21/16* (2013.01)

(58) Field of Classification Search
CPC ......... H02K 1/30; H02K 1/2733; H02K 21/16
See application file for complete search history.

(56) References Cited

U.S. PATENT DOCUMENTS

| 2016/0149449 A1* | 5/2016 | Ivanak ................ F04D 13/064 |
| | | 310/156.13 |
| 2018/0054100 A1 | 2/2018 | Takashima et al. |
| 2021/0257884 A1 | 8/2021 | Jia et al. |

FOREIGN PATENT DOCUMENTS

| CN | 112202257 A | 1/2021 |
|---|---|---|
| EP | 2463510 A1 | 6/2012 |
| JP | 63-056153 | 3/1988 |
| JP | 02-007843 | 1/1990 |
| JP | 2007-288977 | 11/2007 |
| JP | 2018-068018 | 4/2018 |
| JP | 2018-107975 | 7/2018 |
| WO | 2020/093774 A1 | 5/2020 |

OTHER PUBLICATIONS

The EPC Office Action dated Mar. 27, 2024 for the related European Patent Application No. 22804504.3.
International Search Report of PCT application No. PCT/JP2022/018464 dated Jun. 21, 2022.

* cited by examiner

*Primary Examiner* — Viet P Nguyen
(74) *Attorney, Agent, or Firm* — Rimon P.C.

(57) ABSTRACT

A rotor includes a rotating shaft including an axis as a rotation center, a magnet having a cylindrical shape and disposed so as to surround the rotating shaft, and a spacer that is disposed between the rotating shaft and the magnet, includes a sleeve extending from a first end portion to a second end portion along the axis, and fixes the magnet to the rotating shaft via the sleeve.

11 Claims, 12 Drawing Sheets

ROTOR AND ELECTRIC MOTOR

CROSS-REFERENCE TO RELATED APPLICATIONS

This application is a U.S. national stage application of the PCT International Application No. PCT/JP2022/018464 filed on Apr. 21, 2022, which claims the benefit of foreign priority of Japanese patent application 2021-083715 filed on May 18, 2021, the contents all of which are incorporated herein by reference.

TECHNICAL FIELD

The present disclosure relates to a rotor and an electric motor.

BACKGROUND ART

Electric motors are used in various electric devices such as household devices and industrial devices. An electric motor includes a stator and a rotor that rotates by magnetic force of the stator. Conventionally, as a rotor included in an electric motor, a rotor with magnet is known that includes a cylindrical magnet in which a rotating shaft is inserted (see, for example, Patent Literature 1). In a conventional rotor with magnet, a cylindrical magnet and a rotating shaft is fixed together using an adhesive.

However, to fix together a cylindrical magnet and a rotating shaft with an adhesive, a clearance is necessary between the inner circumferential surface of the magnet and the outer circumferential surface of the rotating shaft to apply the adhesive. This clearance may cause eccentricity of the magnet and creates a large imbalance of the rotor. That is, a weight imbalance is produced in the rotor. This disadvantageously increases vibration of the electric motor.

Moreover, to fix together the magnet and the rotating shaft with the adhesive, a time for curing the adhesive is necessary. This disadvantageously lowers productivity of the rotor and results in low productivity of the electric motor.

CITATION LIST

Patent Literature

PTL 1: Unexamined Japanese Patent Publication No. 2018-107975

SUMMARY

The present disclosure has been made to solve the above problems. An object of the present disclosure is to provide a rotor and an electric motor in which a magnet can be fixed to a rotating shaft without using an adhesive.

To achieve the above object, one aspect of a rotor according to the present disclosure includes a rotating shaft including an axis as a rotation center, a magnet having a cylindrical shape and disposed so as to surround the rotating shaft, and a spacer that is disposed between the rotating shaft and the magnet, includes a sleeve extending from a first end portion to a second end portion along the axis, and fixes the magnet to the rotating shaft via the sleeve.

One aspect of the electric motor according to the present disclosure includes the rotor and a stator facing the rotor.

According to the present disclosure, a magnet can be fixed to a rotating shaft without using an adhesive.

DESCRIPTION OF PREFERRED EMBODIMENTS

Figure 1:
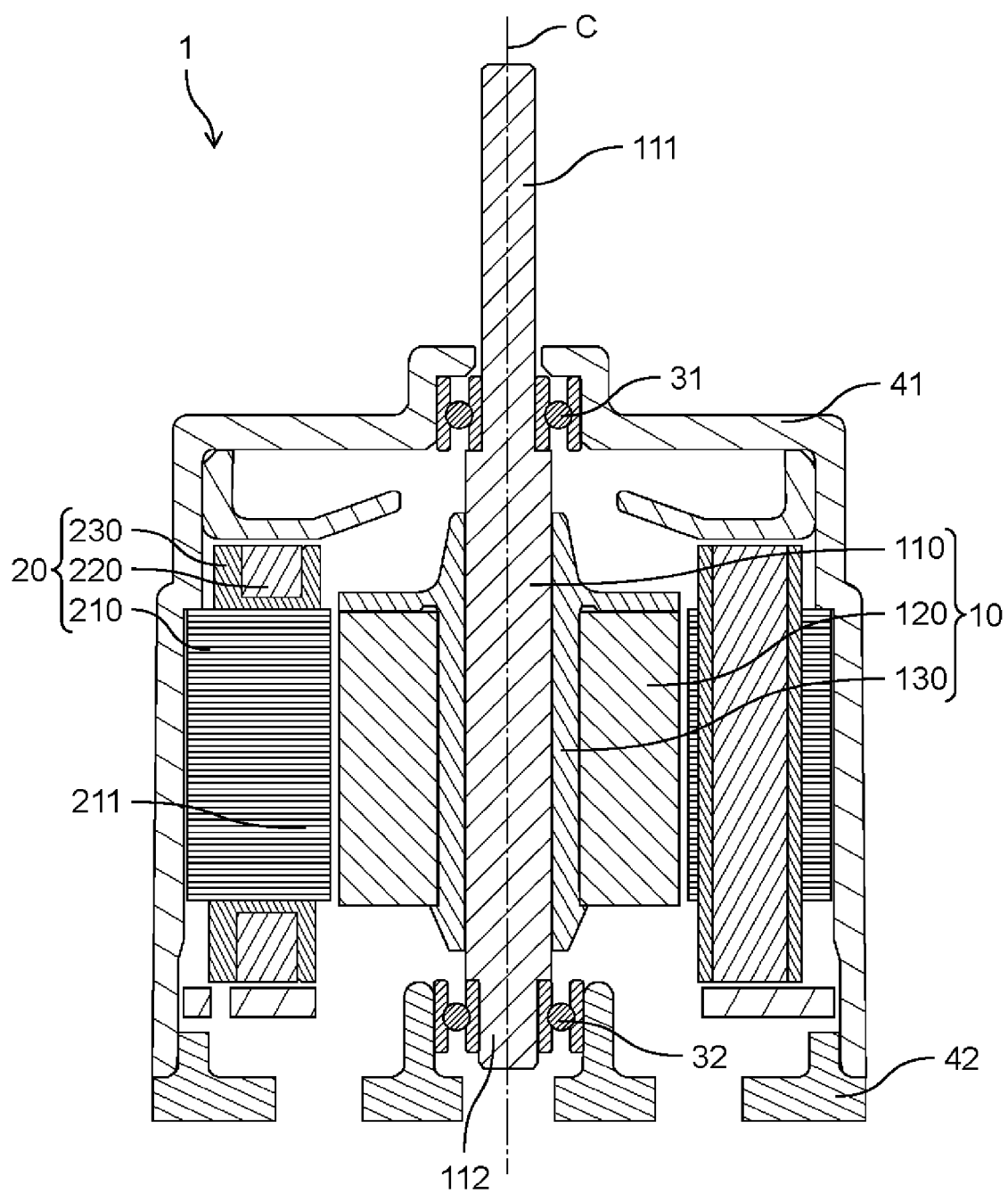
FIG. 1 is a cross-sectional view of an electric motor according to an exemplary embodiment.

Exemplary embodiments of the present disclosure will be described below with reference to the drawings. Each of the exemplary embodiments described below illustrates one specific example of the present disclosure. Therefore, numerical values, shapes, materials, components, arrangement positions and connection modes of components, and the like illustrated in the following exemplary embodiments are illustrative and are not intended to limit the present disclosure. Accordingly, components in the exemplary embodiments below not described in an independent claim are described as optional components.

Note that, the drawings are each a schematic view and are not necessarily precisely illustrated. In the drawings, substantially the same components are denoted by the same reference mark, and duplicate description will be omitted or simplified. In the present description, the terms "up" and "down" do not necessarily indicate an upward direction (vertically above) and a downward direction (vertically below), respectively, in terms of absolute spatial recognition.

Exemplary Embodiment

Figure 2:
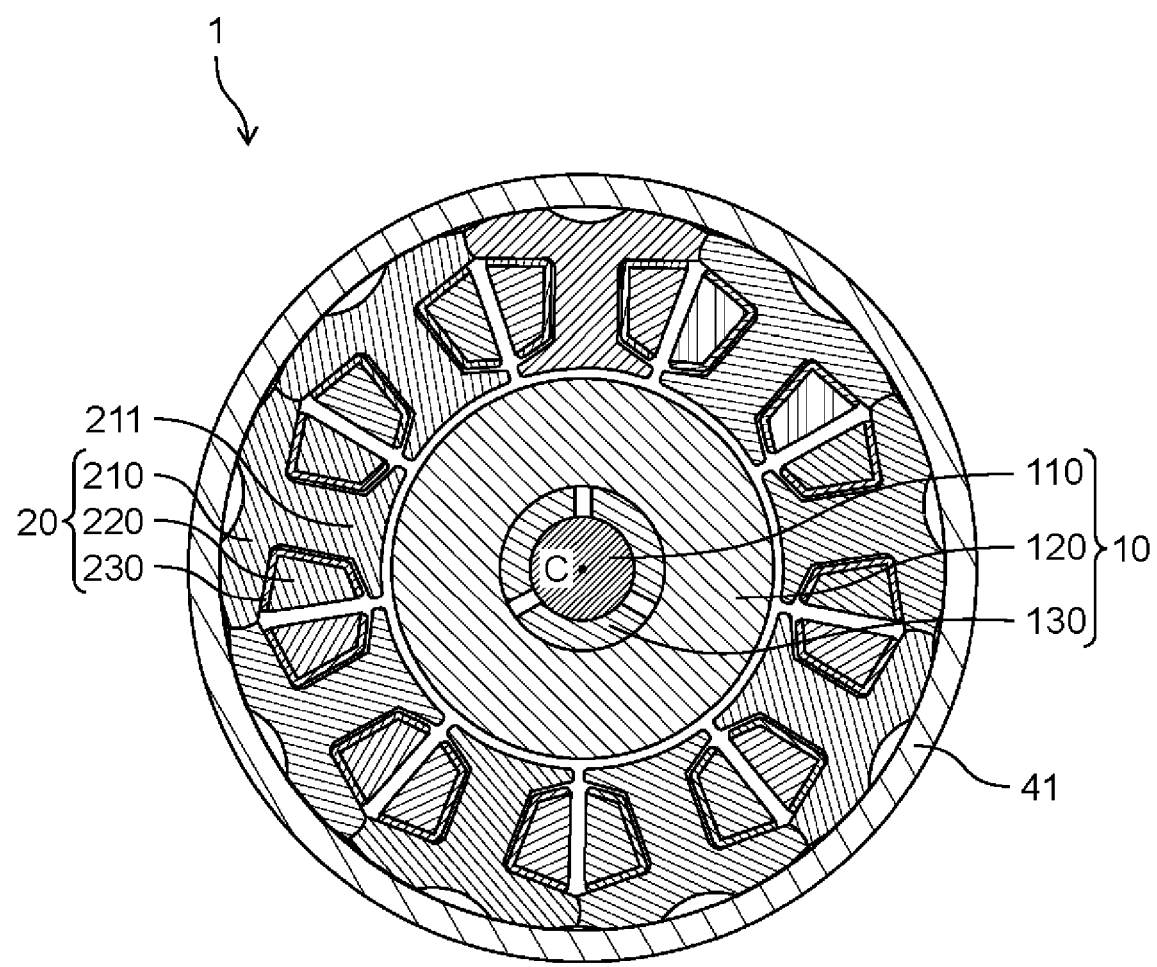
FIG. 2 is a cross-sectional view of the electric motor according to the exemplary embodiment.

First, the general structure of electric motor 1 according to an exemplary embodiment will be described with reference to FIGS. 1 and 2. FIG. 1 is a cross-sectional view of electric motor 1 according to the exemplary embodiment. FIG. 2 is a cross-sectional view of electric motor 1 according to the exemplary embodiment. FIG. 1 is a cross-sectional view in a plane passing through rotating shaft 110. FIG. 2 is a cross-sectional view in a plane orthogonal to rotating shaft 110.

As illustrated in FIGS. 1 and 2, electric motor 1 includes rotor 10, stator 20, first bearing 31, second bearing 32, first bracket 41, and second bracket 42. For example, electric motor 1 is used as a motor for driving a rotary brush mounted on a nozzle head of a vacuum cleaner.

Electric motor 1 is an inner rotor motor in which rotor 10 is disposed in the inner side of stator 20. That is, stator 20 is disposed so as to surround rotor 10.

Rotor 10 (rotor) is disposed in the inner side of stator 20 with a minute air gap between rotor 10 and stator 20. Rotor 10 has a plurality of N-poles and S-poles that are alternately existing along the circumferential direction. Rotor 10 rotates by magnetic force generated by stator 20. Rotor 10 includes rotating shaft 110. Rotor 10 rotates about rotating shaft 110 as a rotation center. Specifically, rotor 10 rotates about axis C of rotating shaft 110 as the rotation center.

Rotor 10 includes rotating shaft 110, magnet 120, and spacer 130. Rotor 10 is a coreless rotor having no core, and is composed only of three components, that is, rotating shaft 110, magnet 120, and spacer 130.

Rotating shaft 110 is a shaft about which rotor 10 rotates. For example, rotating shaft 110 is a metal rod made of a metal material such as stainless used steel (SUS). Rotating shaft 110 extends in the longitudinal direction that is the direction of axis C of rotating shaft 110.

First section 111 of rotating shaft 110 is an end portion of rotating shaft 110. First section 111 of rotating shaft 110 is supported by first bearing 31. Specifically, first section 111 of rotating shaft 110 protrudes from through holes of first bearing 31 and first bracket 41. First section 111 of rotating shaft 110 is a portion on the output side (an output shaft) of rotating shaft 110. Thus, a load to be driven by electric motor 1 is attached to the distal end portion of first section 111 protruding from first bracket 41. Examples of the load include an impeller constituting a blower, and a piston constituting a pump.

Second section 112 of rotating shaft 110 is another end portion of rotating shaft 110 and is supported by second bearing 32. Second section 112 of rotating shaft 110 does not protrude from second bracket 42. In the present exemplary embodiment, second section 112 of rotating shaft 110 is a portion on the anti-output side (an anti-output shaft) of rotating shaft 110.

First bearing 31 and second bearing 32 are, for example, bearings that rotatably support rotating shaft 110. As described above, rotating shaft 110 is rotatably supported by first bearing 31 and second bearing 32. First bearing 31 is fixed to first bracket 41. Second bearing 32 is fixed to second bracket 42.

Magnet 120 has a cylindrical shape. Specifically, magnet 120 is a cylindrical permanent magnet. A plurality of magnets, instead of a single magnet, may constitute magnet 120 as a cylindrical magnet. Magnet 120 is a rare earth magnet made of a rare earth element. Magnet 120 generates a main magnetic flux in rotor 10. The outer circumferential surface of cylindrical magnet 120 forms an air gap surface for creating an air gap between stator 20 and magnet 120. The outer circumferential surface of magnet 120 faces stator 20. Magnet 120 is magnetized to have N poles and S poles alternately existing along the rotating direction of rotating shaft 110 on the air gap surface facing stator 20. In the present exemplary embodiment, magnet 120 is magnetized to have six poles.

Spacer 130 is a magnet spacer. Spacer 130 holds magnet 120 so as to dispose magnet 120 at a predetermined position with respect to rotating shaft 110. A portion of spacer 130 is disposed between rotating shaft 110 and magnet 120.

Spacer 130 is made of a resin material such as polybutylene terephthalate (PBT) or a metal material such as aluminum. Spacer 130 made of resin can be manufactured by integrally molding a resin material. Metal spacer 130 can be manufactured by, for example, die casting. In the present exemplary embodiment, spacer 130 is made of resin. Spacer 130 is preferably made of a material having higher thermal conductivity than rotating shaft 110 and magnet 120. In such a configuration, heat generated by magnet 120 is readily transferred to spacer 130. Therefore, when heat is generated in magnet 120 by operating electric motor 1, reduction in magnetic flux of magnet 120 due to the heat can be suppressed.

A detailed structure of rotating shaft 110, magnet 120, and spacer 130 in rotor 10 will be described later.

Stator 20 (stator) is disposed so as to surround rotor 10 with a minute air gap between stator 20 and rotor 10. Stator 20 generates magnetic force that acts on rotor 10. Stator 20 includes stator core 210 (stator core), winding coil 220, and insulator 230.

Stator core 210 is a field core around which winding coil 220 is wound. Stator core 210 is a magnetic body made of a magnetic material. Stator core 210 is, for example, a stacked body in which a plurality of punched magnetic steel sheets formed in a predetermined shape are stacked in the direction of axis C of rotating shaft 110. Note that, stator core 210 is not limited to a stacked body of magnetic steel sheets, but may be a bulk body made of a magnetic material.

As illustrated in FIG. 2, stator core 210 includes a plurality of teeth 211. The plurality of teeth 211 are formed in a radial shape so as to protrude in a radial direction (radial direction) orthogonal to the direction of axis C of rotating shaft 110. That is, the plurality of teeth 211 protrude toward magnet 120 of rotor 10. The plurality of teeth 211 protrude inward. The plurality of teeth 211 are arranged along the rotating direction of rotating shaft 110 at a constant interval. A slot is formed between two adjacent teeth 211.

Stator core 210 includes a plurality of core blocks. That is, stator core 210 is divided into the plurality of core blocks (divided cores). A plurality of teeth 211 are provided in a corresponding one of the plurality of core blocks. Each of the plurality of core blocks is a stacked body of a plurality of punched magnetic steel sheets.

The plurality of core blocks constituting stator core 210 are disposed in an annular arrangement as a whole. Specifically, nine core blocks are arranged to form an annular shape. Two adjacent core blocks are connected to each other. Note that, stator core 210 may not be divided into the plurality of core blocks.

Winding coil 220 is wound around stator core 210. Specifically, winding coil 220 is wound around each of the plurality of teeth 211 of stator core 210 with insulator 230 therebetween. Each winding coil 220 is composed of unit coils of three phases of U-phase, V-phase, and W-phase, the phases being electrically different by 120 degrees. That is, winding coil 220 wound around each of teeth 211 is energized to be driven by alternating currents of three phases energized in phase units of U-phase, V-phase, and W-phase.

When currents flow in winding coil 220, stator 20 generates a magnetic force that acts on rotor 10. Specifically, when currents flow in winding coil 220, each of the plurality of teeth 211 included in stator core 210 generates magnetic force that acts on rotor 10. The direction of a main magnetic flux generated by stator 20 (teeth 211) is the radial direction extending from rotating shaft 110 as the center.

Insulator 230 is an insulating frame that covers stator core 210. Insulator 230 covers at least teeth 211 of stator core 210. Insulator 230 is made of, for example, an insulating resin material.

First bracket 41 holds first bearing 31. Specifically, first bearing 31 is housed and fixed in a recess provided in first bracket 41.

First bracket 41 is a bottomed cylindrical housing (case) with an opening. First bracket 41 houses rotor 10 and stator 20. A through hole is provided in a bottom of first bracket 41. First section 111 of rotating shaft 110 protrudes from the through hole to the outside of first bracket 41.

First bracket 41 is a metal case made of a metal material such as aluminum and a ferrous material. The first bracket 41 may be made of a resin material instead of a metal material.

Second bracket 42 holds second bearing 32. Specifically, second bearing 32 is housed and fixed in a recess provided in second bracket 42.

Second bracket 42 is a lid disposed to cover the opening of first bracket 41. Second bracket 42 is fixed to an open end of first bracket 41.

Second bracket 42 may be a resin plate made of a resin material or a metal plate made of a metal material.

First bracket 41 and second bracket 42 constitute an outer housing of electric motor 1.

In electric motor 1 configured as described above, when winding coils 220 of stator 20 are energized, field currents flow in winding coils 220 and a magnetic flux is generated in stator 20 (stator core 210). The magnetic force generated by interaction between the magnetic flux generated in stator 20 and the magnetic flux of rotor 10 creates a torque that rotates rotor 10, and rotor 10 rotates about rotating shaft 110.

Figure 3:
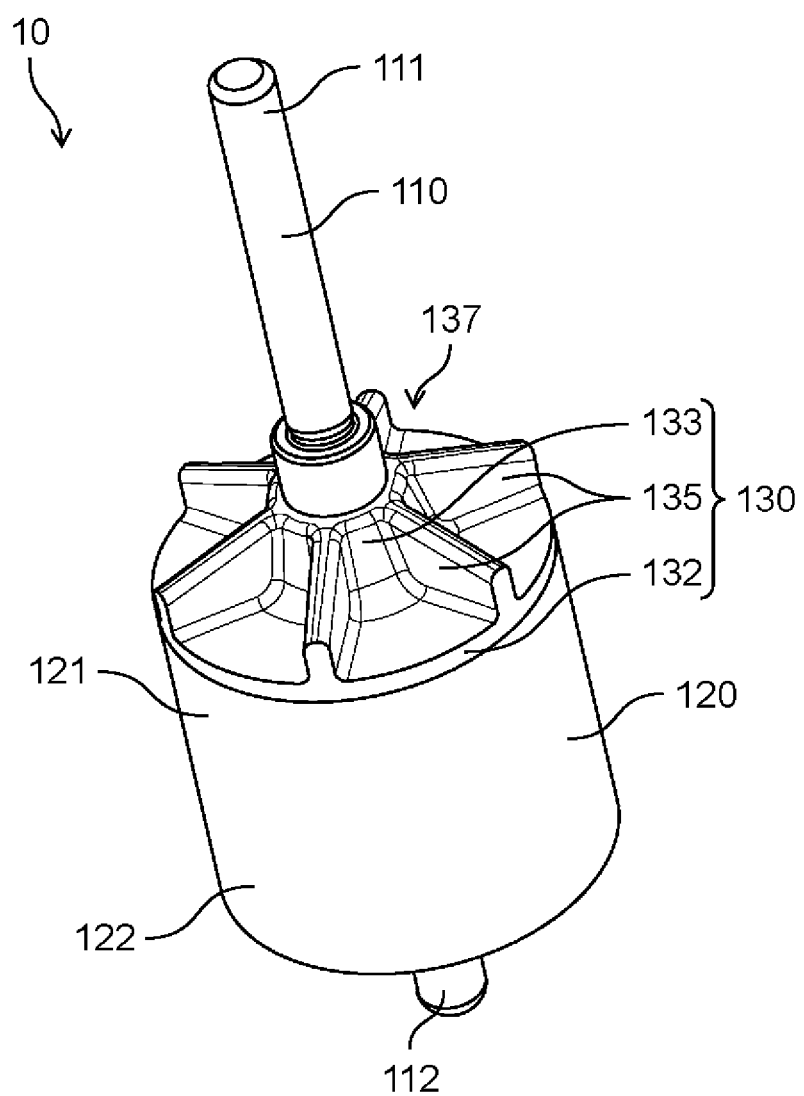
FIG. 3 is a perspective view of a rotor of the electric motor according to the exemplary embodiment as viewed obliquely from above.
Figure 4:
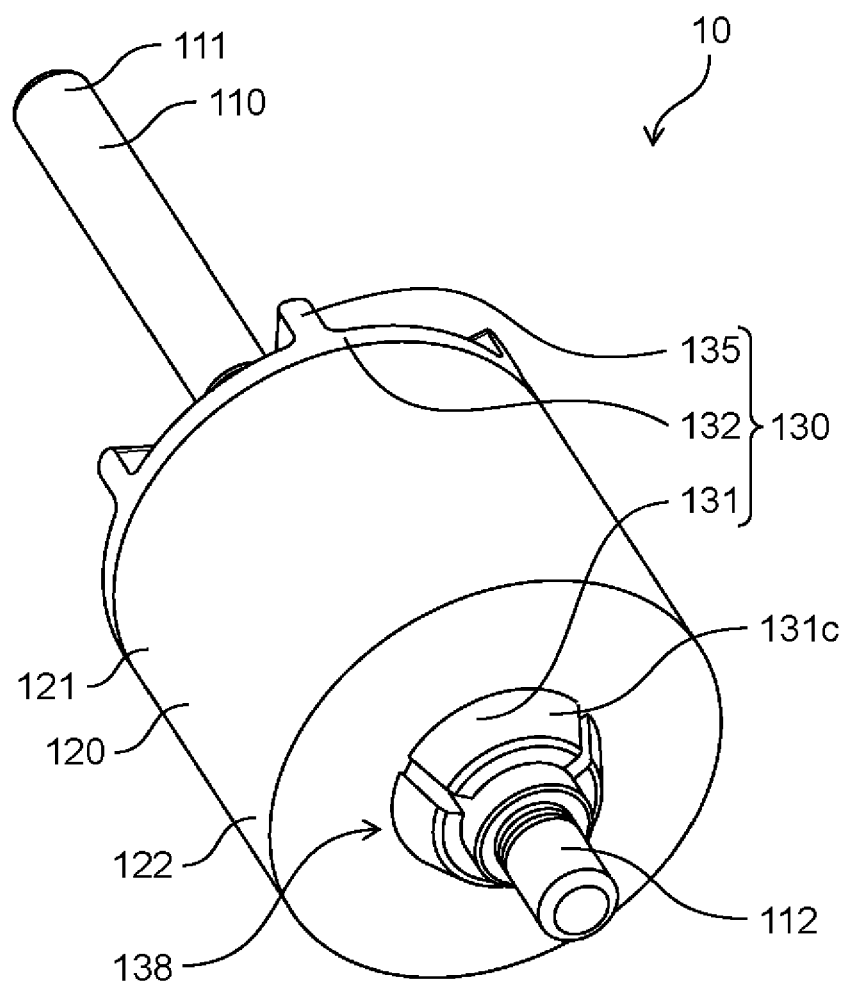
FIG. 4 is a perspective view of the rotor of the electric motor according to the exemplary embodiment as viewed obliquely from below.
Figure 5:
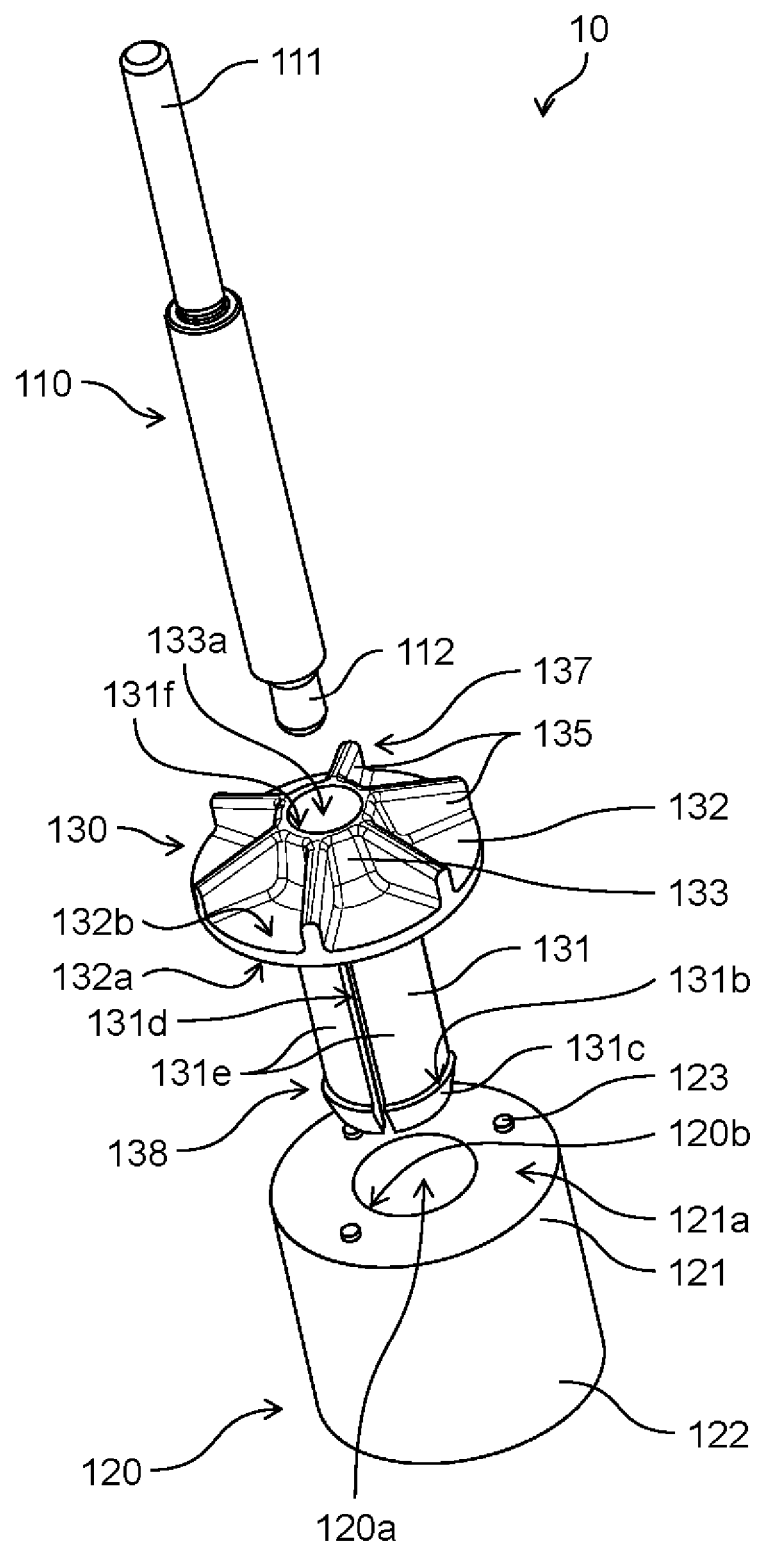
FIG. 5 is an exploded perspective view of the rotor of the electric motor according to the exemplary embodiment as viewed obliquely from above.
Figure 6:
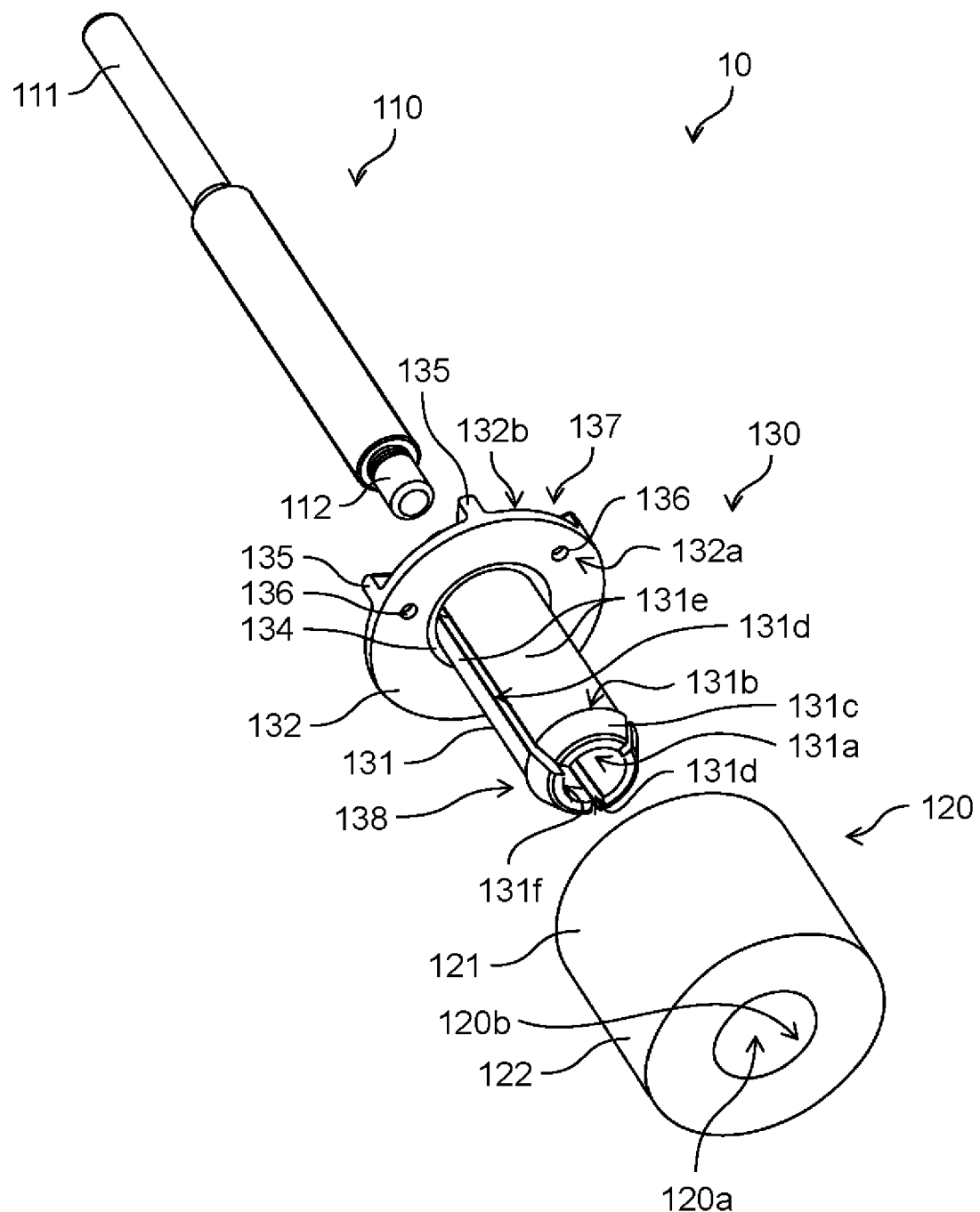
FIG. 6 is an exploded perspective view of the rotor of the electric motor according to the exemplary embodiment as viewed obliquely from below.
Figure 7:
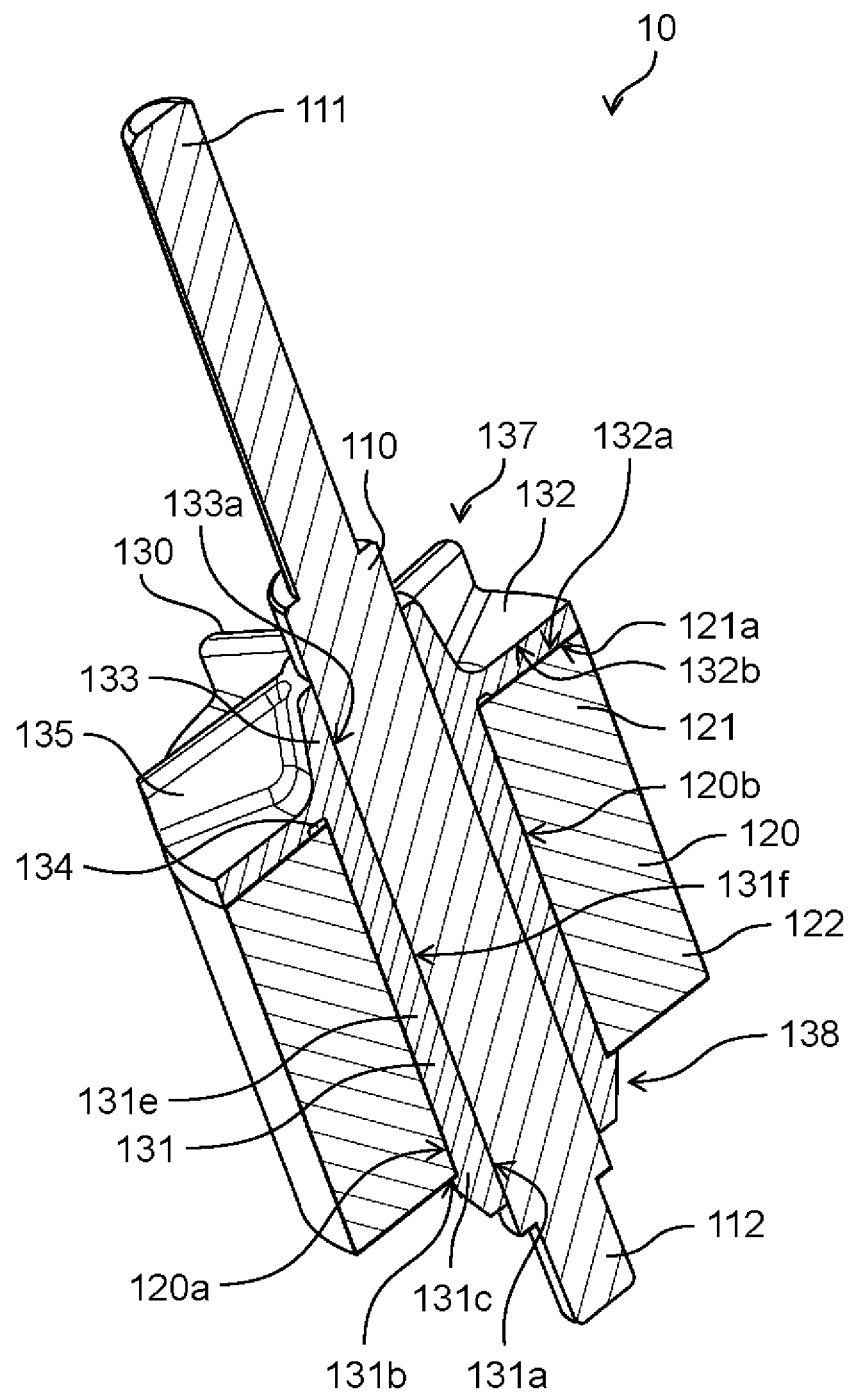
FIG. 7 is a cross-sectional perspective view of the rotor of the electric motor according to the exemplary embodiment.
Figure 8:
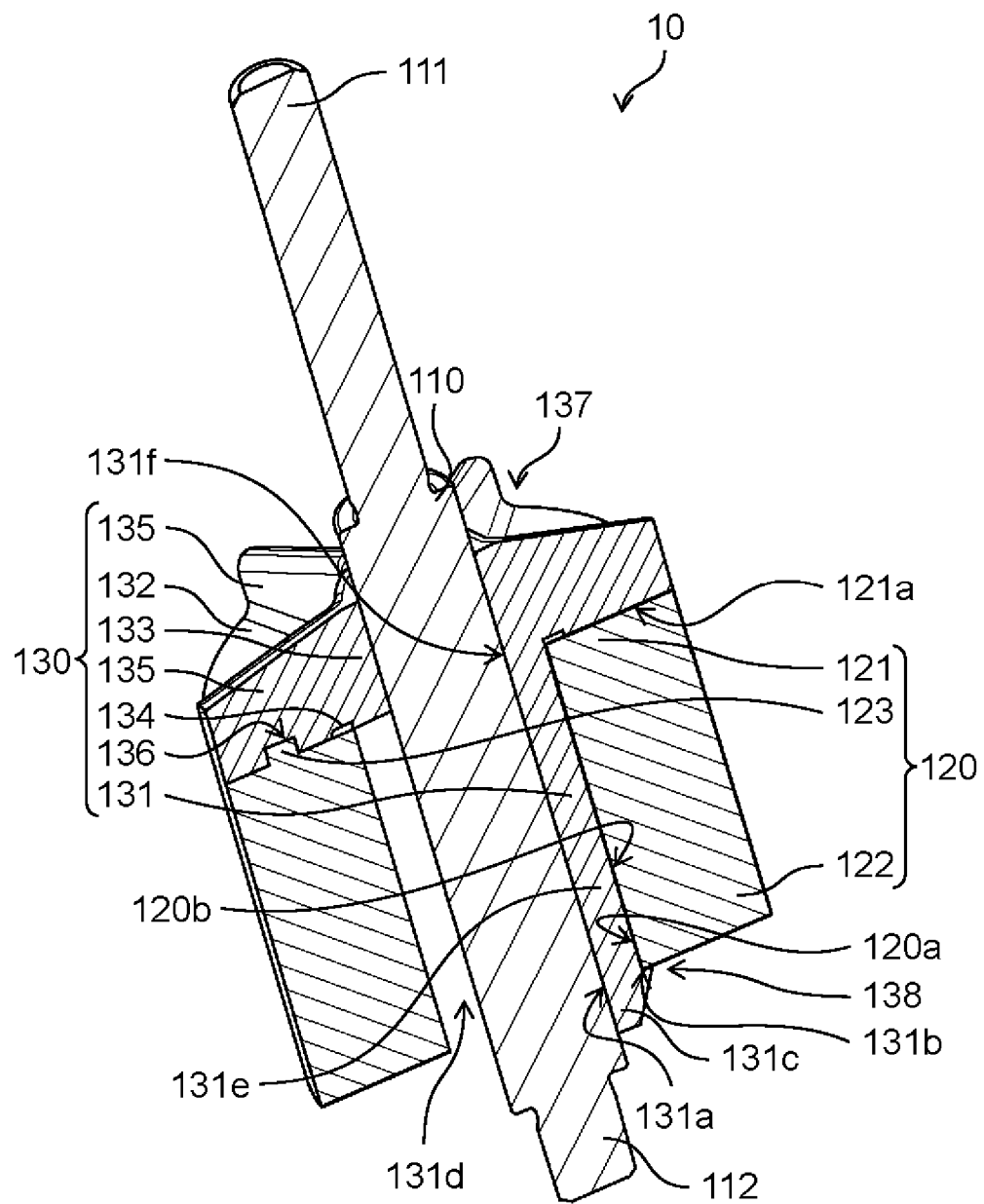
FIG. 8 is a cross-sectional perspective view of the rotor of the electric motor according to the exemplary embodiment with a cross section different from that in FIG. 7.
Figure 9:
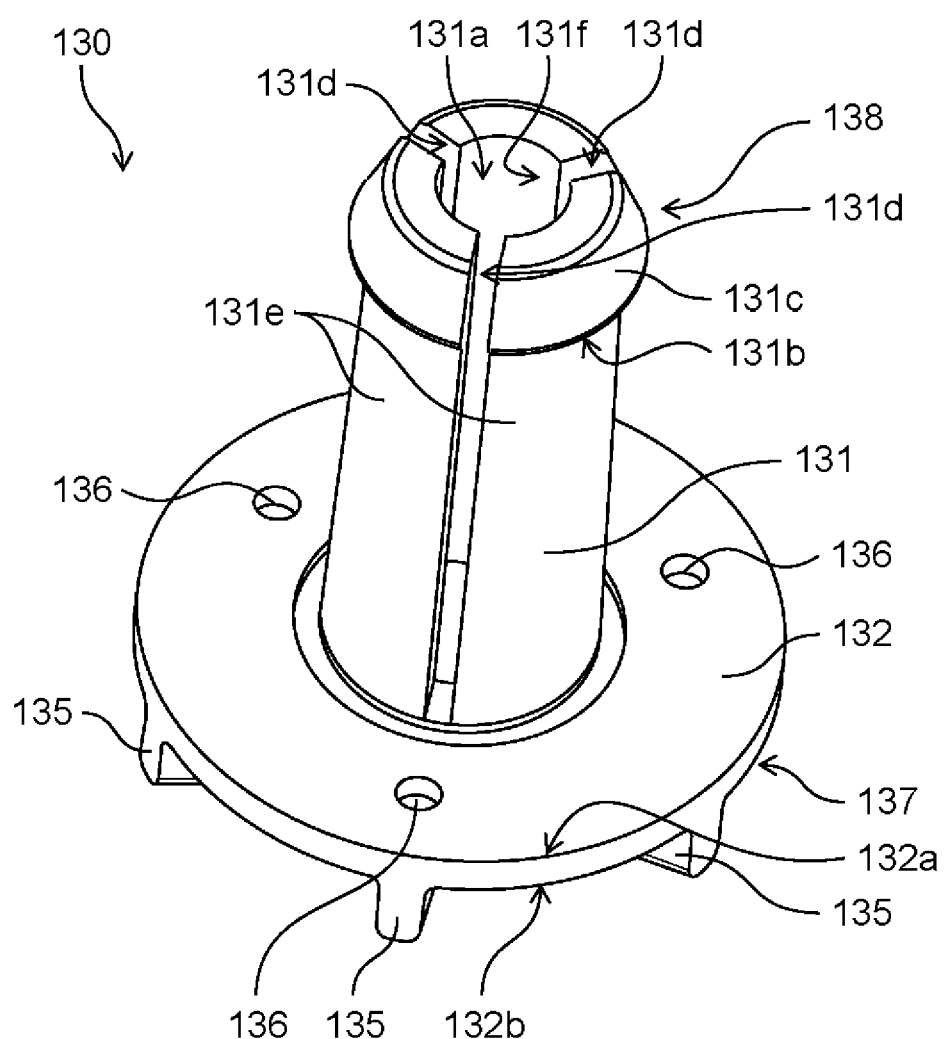
FIG. 9 is a perspective view of a spacer of the rotor of the electric motor according to the exemplary embodiment as viewed from a first sleeve side.
Figure 10:
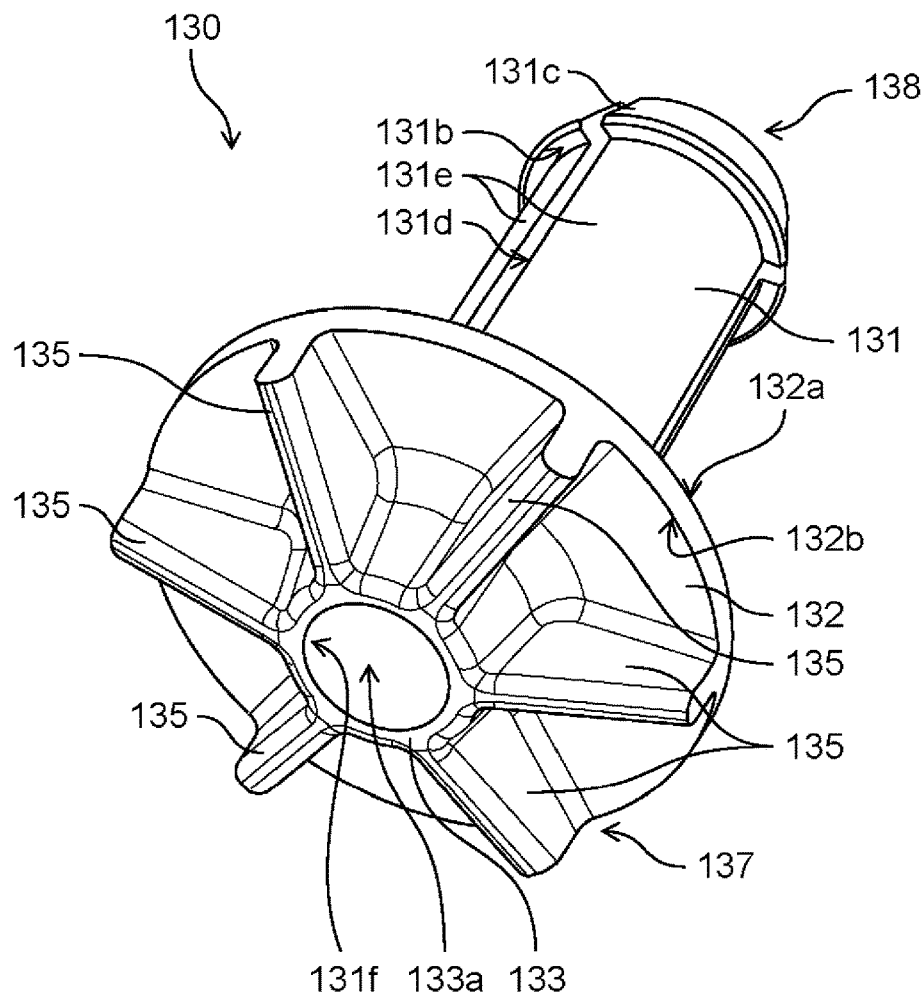
FIG. 10 is a perspective view of the spacer of the rotor of the electric motor according to the exemplary embodiment as viewed from a second sleeve side.

Next, a detailed configuration of rotor 10 of electric motor 1 according to the present exemplary embodiment will be described with reference to FIGS. 3 to 10 as well as FIGS. 1 and 2. FIG. 3 is a perspective view of rotor 10 of electric motor 1 according to the exemplary embodiment as viewed obliquely from above. FIG. 4 is a perspective view of rotor 10 as viewed obliquely from below. FIG. 5 is an exploded perspective view of rotor 10 as viewed obliquely from above. FIG. 6 is an exploded perspective view of rotor 10 as viewed obliquely from below. FIG. 7 is a cross-sectional perspective view of rotor 10. FIG. 8 is a cross-sectional perspective view of rotor 10 with a cross section different from that in FIG. 7. FIG. 9 is a perspective view of spacer 130 of rotor 10 as viewed from a first sleeve 131 side. FIG. 10 is a perspective view of spacer 130 of rotor 10 as viewed from a second sleeve 133 side.

As described above, rotor 10 includes rotating shaft 110, magnet 120, and spacer 130. Rotor 10 is a rotor with magnet in which cylindrical magnet 120 is disposed on the outer circumference of rotating shaft 110.

As illustrated in FIGS. 3 to 8, cylindrical magnet 120 is disposed so as to surround rotating shaft 110. Specifically, magnet 120 is disposed around rotating shaft 110 with spacer 130 therebetween. Cylindrical magnet 120 has through hole 120a. Cylindrical magnet 120 has inner circumferential surface 120b that is a surface of through hole 120a.

At least a part of spacer 130 is located between rotating shaft 110 and magnet 120. Specifically, spacer 130 includes first sleeve 131 disposed between rotating shaft 110 and magnet 120.

As illustrated in FIGS. 7 and 8, first sleeve 131 of spacer 130 is inserted in through hole 120a of magnet 120. That is, through hole 120a of magnet 120 is an insertion hole in which first sleeve 131 is inserted. In other words, inner circumferential surface 120b of magnet 120 faces the outer circumferential surface of spacer 130. Magnet 120 surrounds first sleeve 131.

First sleeve 131 has a substantially cylindrical shape extending in the longitudinal direction that is the direction of axis C of rotating shaft 110. As illustrated in FIG. 9, through hole 131a is formed in first sleeve 131. Spacer 130 that is substantially cylindrical has inner circumferential surface 131f which is a surface of through hole 131a. As illustrated in FIGS. 7 and 8, rotating shaft 110 is inserted in through hole 131a of first sleeve 131. That is, through hole 131a is an insertion hole in which rotating shaft 110 is inserted. In other words, inner circumferential surface 131f of spacer 130 faces the outer circumferential surface of rotating shaft 110.

As described above, first sleeve 131 of spacer 130 is inserted in through hole 120a of magnet 120. Rotating shaft 110 is inserted in through hole 131a of first sleeve 131 of spacer 130. That is, first sleeve 131 is located between rotating shaft 110 and magnet 120. In the present exemplary embodiment, first sleeve 131 is held between rotating shaft 110 and magnet 120. Specifically, first sleeve 131 is in contact with rotating shaft 110 and magnet 120. More specifically, inner circumferential surface 131f of first sleeve 131 is in contact with the outer circumferential surface of rotating shaft 110. The outer circumferential surface of first sleeve 131 is in contact with inner circumferential surface 120b of magnet 120.

As illustrated in FIGS. 3 to 10, spacer 130 further includes flange 132 that extends from first sleeve 131 in the radial direction of rotating shaft 110. Flange 132 is provided at an end of first sleeve 131, the end being in the vicinity of first end portion 137. That is, flange 132 extends from an end of first sleeve 131 in a direction orthogonal to rotating shaft 110 (that is, in the radial direction). Therefore, first sleeve 131 is erected from flange 132.

Flange 132 is formed over the entire circumference of first sleeve 131. Specifically, flange 132 has a disk shape with an opening. Therefore, when viewed along the direction of axis C of rotating shaft 110, flange 132 has a circular profile. The outer diameter of flange 132 is larger than the outer diameter of first sleeve 131. Flange 132 may have a tapered conical shape.

As illustrated in FIGS. 7 and 8, flange 132 supports third end portion 121 which is an end portion, in a cylindrical axis direction, of magnet 120. Specifically, flange 132 supports annular end face 121a of third end portion 121 of magnet 120. That is, end face 121a of third end portion 121 of magnet 120 and first face 132a of flange 132 are in surface contact with each other. As described above, first face 132a of flange 132 is a surface with which magnet 120 is brought into contact.

Meanwhile, fourth end portion 122 which is the other end portion, in the cylindrical axis direction, of magnet 120 is engaged with hook part 131b provided at a distal end portion of the first sleeve 131, the distal end portion being located at second end portion 138 which is the other end portion of first sleeve 131. Hook part 131b of first sleeve 131 is a part provided with a large diameter part 131c that extends outward at second end portion 138, which is the distal end portion of first sleeve 131. As illustrated in FIGS. 3 to 10, large diameter part 131c has a truncated conical tubular shape of which outer diameter decreases toward the distal end of the first sleeve 131, and the outer circumferential surface of large diameter part 131c is a tapered surface (inclined surface).

As illustrated in FIGS. 6 to 9, first sleeve 131 is provided on a first face 132a side of flange 132. First sleeve 131 is provided so as to protrude from the central portion of first face 132a of flange 132.

Second sleeve 133 is provided to flange 132 on a second face 132b side opposite to first face 132a. Second face 132b of flange 132 is a face opposite to a face of flange 132 with which magnet 120 is brought into contact. Flange 132 is located between first sleeve 131 and second sleeve 133.

Second sleeve 133 is provided so as to protrude from the central portion of second face 132b of flange 132. Second sleeve 133 has a substantially cylindrical shape similar to first sleeve 131, but the height of second sleeve 133 is shorter than the height of first sleeve 131. Through hole 133a of second sleeve 133 communicates with through hole 131a of first sleeve 131, and rotating shaft 110 is inserted in through hole 133a of second sleeve 133. The inner diameter of through hole 131a of first sleeve 131, the inner diameter of through hole 133a of second sleeve 133, and the outer diameter of rotating shaft 110 are the same. The outer diameter of first sleeve 131 and the outer diameter of second sleeve 133 are substantially the same.

As illustrated in FIGS. 5 and 6, first sleeve 131 is provided with a plurality of slits 131d. The plurality of slits 131d extend from second end portion 138, which is the distal end portion of first sleeve 131, to flange 132 along the direction of axis C of rotating shaft 110. That is, first sleeve 131 has a plurality of extension parts 131e separated in the circumferential direction by the plurality of slits 131d. The plurality of extension parts 131e extend from flange 132 along the cylindrical axis direction as parts of first sleeve 131. The plurality of extension parts 131e join at end portions thereof to be integrated on a flange 132 side. Note that, it is not necessary that slits reach flange 132 as long as an effect described later is obtained.

As illustrated in FIG. 6, space 134 is provided at a boundary between first sleeve 131 and flange 132. That is, space 134 is a recess provided at a root of first sleeve 131 on the flange 132 side. Specifically, space 134 is formed by depressing first face 132a of flange 132. Space 134 is an annular groove formed at the root of first sleeve 131 so as to surround first sleeve 131. Space 134 has a cross-sectional shape of a rectangular groove having a constant width, but the present invention is not limited to this configuration. For example, space 134 may be provided on the outer circumferential surface of first sleeve 131.

As illustrated in FIGS. 3 to 10, second face 132b of flange 132 is provided with a plurality of partition walls 135 extending in the radial direction of rotating shaft 110. That is, the plurality of partition walls 135 are radially formed around rotating shaft 110. Specifically, the plurality of partition walls 135 are erected on second face 132b of flange 132 and extend from the outer circumferential surface of second sleeve 133 to the outer circumferential edge of flange 132. The plurality of partition walls 135 are provided at a constant angular interval along the rotating direction of rotating shaft 110. In the present exemplary embodiment, six partition walls 135 are provided at an angular interval of 60 degrees.

As illustrated in FIGS. 6 and 8, first recess 136 is provided in first face 132a of flange 132. As illustrated in FIGS. 5 and 8, first protrusion 123 is provided on end face 121a of third end portion 121 of magnet 120. First recess 136 of flange 132 and first protrusion 123 of magnet 120 are provided at positions facing each other. As illustrated in FIG. 8, first recess 136 of flange 132 fits on first protrusion 123 of magnet 120. For example, first recess 136 of flange 132 has a cylindrical hole shape and first protrusion 123 of magnet 120 have a columnar shape. However, the present invention is not limited to this configuration.

In the present exemplary embodiment, a plurality of first recesses 136 of flange 132 and a plurality of first protrusions 123 of magnet 120 are provided. First recesses 136 of flange 132 and first protrusions 123 of magnet 120 are provided by the same number. As long as magnet 120 can be fixed to flange 132, the number of first protrusions 123 may be smaller than the number of first recesses 136. The plurality of first recesses 136 and the plurality of first protrusions 123 are provided at a constant angular interval along the rotating direction of rotating shaft 110. In the present exemplary embodiment, as illustrated in FIGS. 5 and 6, three first recesses 136 and three first protrusions 123 are provided at an angular interval of 120 degrees.

In this case, as illustrated in FIGS. 8 and 9, first recesses 136 formed in flange 132 are located at places overlapping partition walls 135 when viewed along the direction of axis C of rotating shaft 110. That is, first recesses 136 formed in flange 132 are provided at the same angular positions about rotating shaft 110 as partition walls 135 to be behind partition walls 135.

In rotor 10 configured as described above, rotating shaft 110 is inserted in first sleeve 131 of spacer 130, whereby rotating shaft 110, magnet 120, and spacer 130 are integrally fixed. In this state, magnet 120 is fixed by spacer 130 at a predetermined position with respect to rotor 10. Specifically, spacer 130 fixes magnet 120 to rotating shaft 110 via first sleeve 131 inserted between rotating shaft 110 and magnet 120.

Figure 11A:
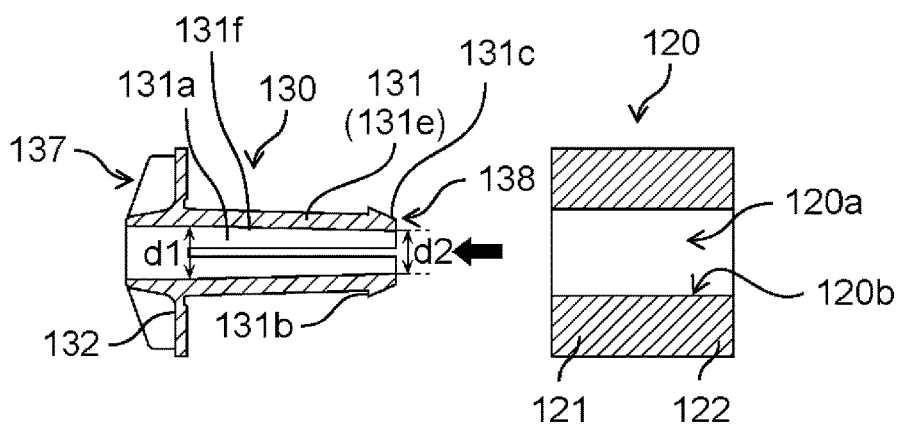
FIG. 11A is a view for explaining a magnet being attached to the spacer by a method for assembling the rotor according to the exemplary embodiment.
Figure 11B:
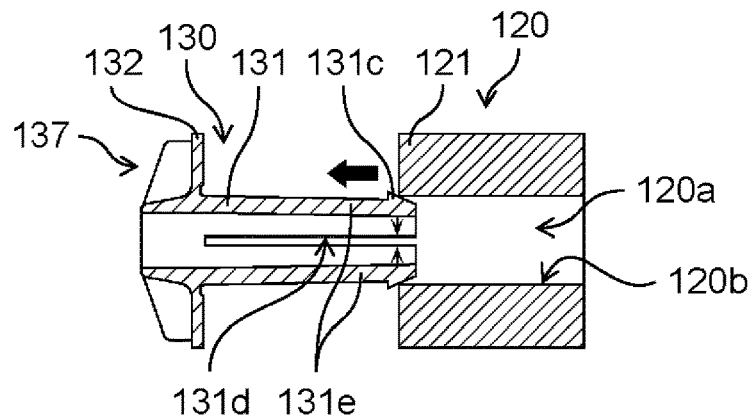
FIG. 11B is a view for explaining the magnet being attached to the spacer by the method for assembling the rotor according to the exemplary embodiment.
Figure 11C:
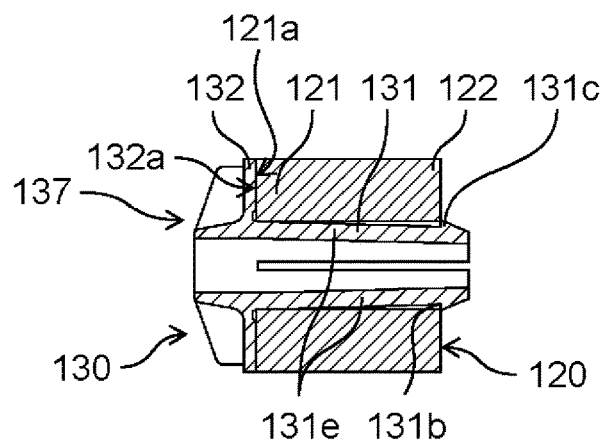
FIG. 11C is a view for explaining the magnet being attached to the spacer by the method for assembling the rotor according to the exemplary embodiment.
Figure 12A:
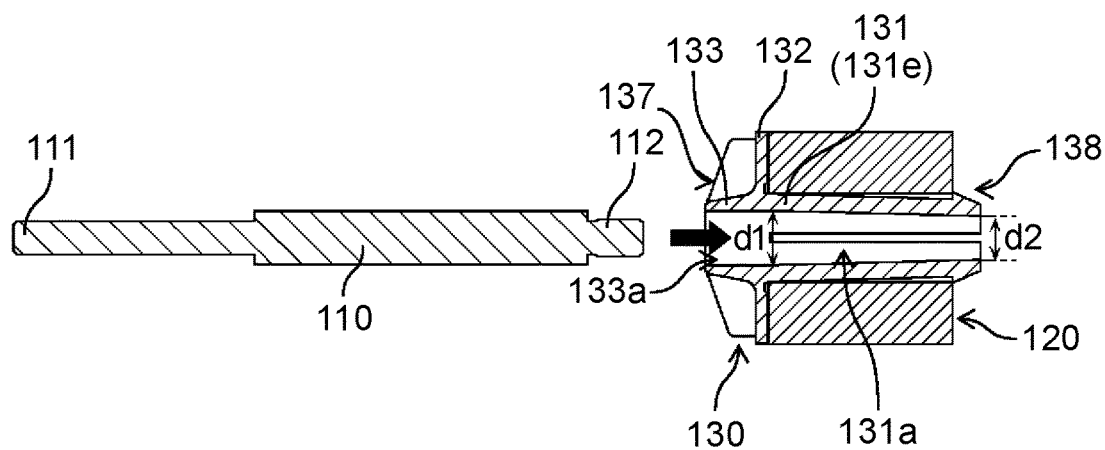
FIG. 12A is a view for explaining a rotating shaft being attached to the spacer, to which the magnet has been attached, by the method for assembling the rotor according to the exemplary embodiment.
Figure 12B:
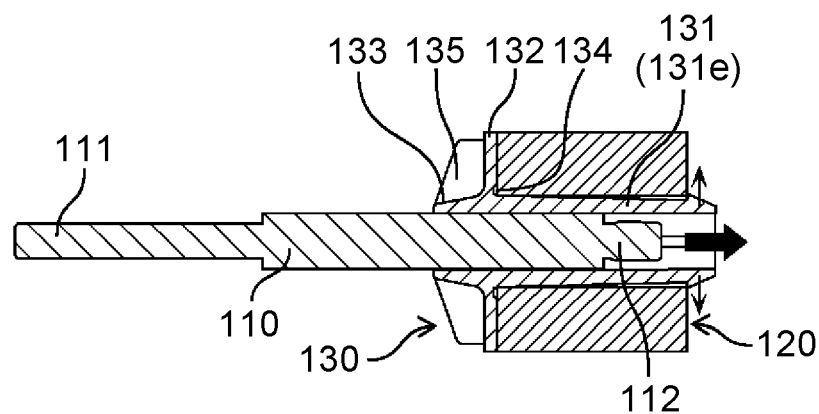
FIG. 12B is a view for explaining the rotating shaft being attached to the spacer, to which the magnet has been attached, by the method for assembling the rotor according to the exemplary embodiment.
Figure 12C:
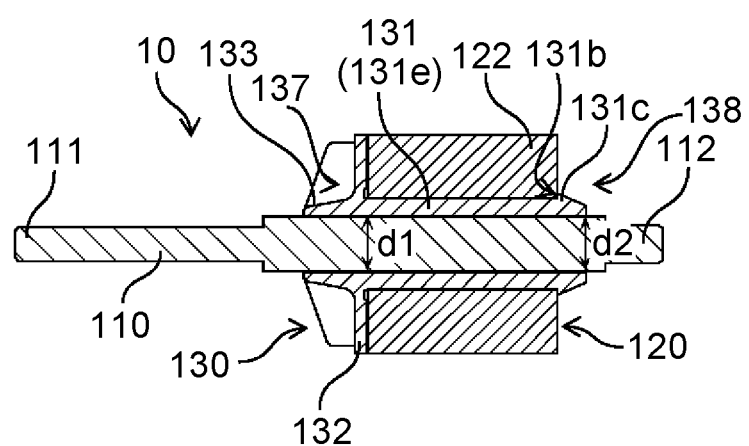
FIG. 12C is a view for explaining the rotating shaft being attached to the spacer, to which the magnet has been attached, by the method for assembling the rotor according to the exemplary embodiment.

A method for assembling rotor 10 will be described with reference to FIGS. 11A, 11B, 11C, 12A, 12B, and 12C. FIGS. 11A, 11B, 11C, 12A, 12B, and 12C are diagrams for explaining the method for assembling rotor 10 according to the exemplary embodiment. FIGS. 11A, 11B, and 11C are views for explaining magnet 120 being attached to spacer 130 by the method for assembling the rotor according to the exemplary embodiment. FIGS. 12A, 12B, and 12C are views for explaining rotating shaft 110 being attached to spacer 130, to which magnet 120 has been attached, by the method for assembling the rotor according to the exemplary embodiment.

As illustrated in FIG. 11A, cylindrical magnet 120 having through hole 120a and spacer 130 are prepared. Before assembling magnet 120 and spacer 130, a relationship of d1>d2 is satisfied, where d1 is an inner diameter of spacer 130 on a first end portion 137 side, specifically, an inner diameter at an end of first sleeve 131 of spacer 130 on the flange 132 side, and d2 is an inner diameter of second end portion 138 which is the distal end portion of first sleeve 131 of spacer 130. That is, the inner diameter of through hole 131a of first sleeve 131 of spacer 130 as a single part satisfies d1>d2. Specifically, the outer diameter and the inner diameter of first sleeve 131 gradually decrease from an end on the flange 132 side that is on the first end portion 137 side toward second end portion 138. That is, first sleeve 131 has a shape tapering toward second end portion 138. The outer circumferential surface and inner circumferential surface 131f of first sleeve 131 are tapered surfaces (inclined surfaces) that are gently inclined from the end on the flange 132 side that is on the first end portion 137 side toward second end portion 138.

Next, as for magnet 120 and spacer 130 that have been prepared, as indicated by an arrow in FIG. 11A, magnet 120 is fitted in spacer 130 such that first sleeve 131 of spacer 130 is inserted in through hole 120a of magnet 120.

Note that, the outer diameter of hook part 131b of large diameter part 131c provided at second end portion 138 which is the distal end portion of first sleeve 131 is larger than the inner diameter of through hole 120a of magnet 120. Therefore, in midway of fitting magnet 120 in spacer 130, as illustrated in FIG. 11B, inner circumferential surface 120b of through hole 120a of magnet 120 is brought into contact with the outer circumferential surface of large diameter part 131c of spacer 130. Here, first sleeve 131 is divided into the plurality of extension parts 131e by the plurality of slits 131d, and the outer circumferential surface of large diameter part 131c is a tapered surface. Therefore, by further pushing magnet 120 toward flange 132 of spacer 130, first sleeve 131 (extension parts 131e) is pushed by inner circumferential surface 120b of magnet 120 and flexes inward. Therefore, magnet 120 advances over large diameter parts 131c of first sleeve 131.

As a result, as illustrated in FIG. 11C, magnet 120 can be brought into contact with flange 132 of spacer 130. Specifically, end face 121a of third end portion 121 of magnet 120 is brought into surface contact with first face 132a of flange 132 of spacer 130. Now, although not illustrated, each of the plurality of first protrusions 123 provided on end face 121a of third end portion 121 of magnet 120 fits in the corresponding one of first recesses 136 provided in first face 132a of flange 132.

When magnet 120 has advanced over large diameter part 131c of first sleeve 131, first sleeve 131 (extension parts 131e) that has flexed inward returns to the original shape, and fourth end portion 122 of magnet 120 engages with hook part 131b of first sleeve 131.

As described above, third end portion 121 of magnet 120 is brought into contact with flange 132 of spacer 130, and fourth end portion 122 of magnet 120 engages with hook part 131b of spacer 130, whereby magnet 120 is sandwiched between flange 132 and hook part 131b of spacer 130. That is, magnet 120 is restricted from moving in the cylindrical axis direction by flange 132 and hook part 131b of spacer 130. As a result, magnet 120 is attached to spacer 130 in a state of being fitted on first sleeve 131 of spacer 130.

Next, rotating shaft 110 is attached to spacer 130 to which magnet 120 has been attached. Specifically, as illustrated in FIG. 12A, rotating shaft 110 is inserted in through hole 131a formed in first sleeve 131 of spacer 130. In the present exemplary embodiment, rotating shaft 110 is press-fitted in through hole 131a formed in first sleeve 131 of spacer 130.

Before inserting rotating shaft 110 in spacer 130, first sleeve 131 of spacer 130 is not flexed. That is, the plurality of extension parts 131e are not flexed. Therefore, before press-fitting rotating shaft 110 in through hole 131a in first sleeve 131, inner diameter d1 of the end portion of first sleeve 131 on the flange 132 side, which is on the first end portion 137 side, and inner diameter d2 of second end portion 138 of first sleeve 131 still satisfy d1>d2.

Then, as illustrated in FIG. 12B, rotating shaft 110 is inserted in spacer 130 from the second sleeve 133 side. Specifically, second section 112 of rotating shaft 110 is first inserted in through hole 133a in second sleeve 133 of spacer 130. Then, rotating shaft 110 is pushed toward second end portion 138, which is the distal end portion of first sleeve 131, so that rotating shaft 110 is inserted in through hole 131a in first sleeve 131.

In this state, since the inner diameter of through hole 133a of first sleeve 131 satisfies d1>d2, second section 112 of rotating shaft 110 is gradually pressed by inner circumferential surface 131f of through hole 133a as rotating shaft 110 is pushed in through hole 133a toward second end portion 138, which is the distal end portion of first sleeve 131. Since first sleeve 131 is divided into the plurality of extension parts 131e by the plurality of slits 131d, first sleeve 131 (extension parts 131e) is pressed by rotating shaft 110, which is being further pushed, to flex outward. That is, first sleeve 131 (extension parts 131e) is pushed outward to expand by rotating shaft 110.

As a result, inner circumferential surface 120b of through hole 120a in magnet 120 is pressed by the outer circumferential surface of first sleeve 131, whereby magnet 120 and first sleeve 131 are pressed against each other to be in tight contact.

Space 134 is provided in spacer 130 at a boundary between first sleeve 131 and flange 132. Therefore, first sleeve 131 (extension parts 131e) easily flexes from the boundary (root) between first sleeve 131 and flange 132. Thus, as illustrated in FIG. 12C, the entire outer circumferential surface of first sleeve 131 surrounded by magnet 120 can be readily brought into tight contact with inner circumferential surface 120b of through hole 120a of magnet 120.

In this case, when the plurality of partition walls 135 are not provided on flange 132, outward flexing of first sleeve 131 (extension parts 131e) may create stress in flange 132 and cause deformation of disk-shaped flange 132 to bend. But with the plurality of partition walls 135 provided on flange 132, deformation of flange 132 caused by flexing of first sleeve 131 (extension parts 131e) can be suppressed. That is, the plurality of partition walls 135 serve as reinforcing ribs to suppress deformation of flange 132. Furthermore, when viewed along the direction of axis C of rotating shaft 110, first recesses 136 and partition walls 135 of spacer 130 are positioned so as the corresponding ones to overlap each other. With this configuration, deformation of flange 132 can be suppressed. In addition, first recess 136 can further reliably fit on first protrusion 123 of magnet 120.

As described above, first sleeve 131 is pushed outward by rotating shaft 110 to press magnet 120 and spacer 130 against each other into tight contact, whereby magnet 120 is fixed to spacer 130.

In addition, rotating shaft 110 that has pushed first sleeve 131 outward is press-fitted in through hole 131a of first sleeve 131. That is, rotating shaft 110 and first sleeve 131 are pressed against each other to be in tight contact, whereby rotating shaft 110 is also fixed to spacer 130. As illustrated in FIG. 12C, in this state, inner diameter d1 of the end portion (on the first end portion 137 side) of first sleeve 131 on the flange 132 side and inner diameter d2 of second end portion 138, which is the distal end portion of first sleeve 131, satisfy d1=d2.

As described above, rotor 10 in which rotating shaft 110, magnet 120, and spacer 130 are integrally fixed can be manufactured by inserting rotating shaft 110 in first sleeve 131 of spacer 130.

As described above, rotor 10 according to the present exemplary embodiment includes rotating shaft 110, magnet 120 having a cylindrical shape and disposed so as to surround rotating shaft 110, and spacer 130 that includes first sleeve 131 disposed between rotating shaft 110 and magnet 120 and fixes magnet 120 to rotating shaft 110 via first sleeve 131.

With this configuration, magnet 120 can be fixed to rotating shaft 110 without using an adhesive.

Accordingly, there is no need to provide a clearance for applying an adhesive between magnet 120 and rotating shaft 110, and occurrence of a weight imbalance in rotor 10 due to eccentricity of magnet 120 caused by the clearance can be suppressed. Thus, vibration of electric motor 1 can be suppressed.

Moreover, since magnet 120 is fixed to rotating shaft 110 without using an adhesive, a time for curing the adhesive is not needed. As a result, the productivity of rotor 10 and also the productivity of electric motor 1 can be improved as compared with the case where a magnet and a rotating shaft are fixed using an adhesive.

As for rotor 10 according to the present exemplary embodiment, rotating shaft 110 is inserted in first sleeve 131 of spacer 130. Rotating shaft 110, magnet 120, and spacer 130 are thereby integrally fixed.

With this configuration, rotating shaft 110 and magnet 120 can be easily fixed via spacer 130 by simply inserting rotating shaft 110 in first sleeve 131 of spacer 130.

In rotor 10 according to the present exemplary embodiment, spacer 130 includes flange 132 that extends from first sleeve 131 in the radial direction of rotating shaft 110. Flange 132 supports third end portion 121 of magnet 120.

With this configuration, the movement of cylindrical magnet 120 in the cylindrical axis direction, that is, the direction along axis C, can be restricted. As a result, rotating shaft 110, magnet 120, and spacer 130 can be more reliably fixed.

In rotor 10 according to the present exemplary embodiment, first sleeve 131 of spacer 130 is provided with the plurality of slits 131d each extending from the distal end portion of first sleeve 131 to flange 132 along the direction of axis C of rotating shaft 110.

With this configuration, first sleeve 131 can easily flex from the root of first sleeve 131 on the flange 132 side. This allows easily press-fitting rotating shaft 110 in through hole 131a of first sleeve 131. In addition, first sleeve 131 can be easily inserted into through hole 120a of magnet 120.

In this case, before press-fitting rotating shaft 110 in first sleeve 131, the relationship of d1>d2 is satisfied, where d1 is the inner diameter of the end portion (on the first end portion 137 side) of first sleeve 131 on the flange 132 side and d2 is the inner diameter of second end portion 138, which is the distal end portion of first sleeve 131.

With this configuration, when inserting first sleeve 131 in through hole 120a of magnet 120 before inserting rotating shaft 110 in through hole 131a of first sleeve 131, first sleeve 131 can be easily inserted in through hole 120a of magnet 120. And thereafter, when inserting rotating shaft 110 in through hole 131a of first sleeve 131 of spacer 130 to which magnet 120 has been attached, rotating shaft 110 can be pushed easily in through hole 131a of first sleeve 131. Then, by pushing rotating shaft 110, first sleeve 131 is pushed outward and rotating shaft 110 can be easily press-fitted in first sleeve 131.

In rotor 10 of the present exemplary embodiment, space 134 is provided in spacer 130 at a boundary between first sleeve 131 and flange 132.

This makes first sleeve 131 easily flex from the boundary between first sleeve 131 and flange 132. Thus, the entire outer circumferential surface of first sleeve 131 surrounded by magnet 120 can be readily brought into tight contact with inner circumferential surface 120b of through hole 120a of magnet 120.

In rotor 10 according to the present exemplary embodiment, the plurality of partition walls 135 extending in the radial direction of rotating shaft 110 are provided on second face 132b that is a surface of flange 132 of spacer 130 opposite to a surface with which magnet 120 is brought into contact.

With this configuration, the plurality of partition walls 135 serve as reinforcing ribs, and can suppress deformation of flange 132 that may occur by stress produced by flexing of first sleeve 131 caused by press-fitting rotating shaft 110 in through hole 131a of first sleeve 131.

In rotor 10 according to the present exemplary embodiment, first recesses 136 and partition walls 135 are provided to spacer 130 at positions where corresponding ones overlap each other when viewed in the direction of axis C of rotating shaft 110.

With this configuration, first recesses 136 formed in flange 132 of spacer 130 can suppress deformation and bending of flange 132. With this configuration, fitting of first protrusions 123 formed on magnet 120 can be made more reliably.

In addition, the plurality of partition walls 135 serve not only as reinforcing ribs but also as heat dissipation fins, and can suppress the magnetic flux of magnet 120 being reduced by heat. This point will be described below.

In rotor 10 using a rare earth magnet as magnet 120, more heat is generated for a smaller rotor and a motor with a higher output. The heat may reduce the magnetic flux of magnet 120 during driving of electric motor 1. However, in rotor 10 in the present exemplary embodiment, the plurality of partition wall 135 provided on flange 132 can dissipate heat transferred to magnet 120. In particular, since flange 132 rotates as a part of rotor 10 during driving of electric motor 1, the plurality of partition walls 135 provided on flange 132 serve as a centrifugal fan to generate cooling air. As a result, the inside of rotor 10 and electric motor 1 can be efficiently cooled. Therefore, electric motor 1 having a smaller size and a higher output can be provided.

In rotor 10 according to the present exemplary embodiment, spacer 130 is preferably made of a material having higher thermal conductivity than rotating shaft 110 and magnet 120.

With this configuration, heat of magnet 120 is readily transferred to spacer 130. Therefore, reduction in the magnetic flux of magnet 120 by heat can further be suppressed.

In rotor 10 according to the present exemplary embodiment, first recess 136 is provided in first face 132a of flange 132 of spacer 130, first face 132a being a face with which magnet 120 is brought into contact. First protrusions 123 are provided on end face 121a of magnet 120, end face 121a being a face with which flange 132 is brought into contact. First recess 136 of spacer 130 fits on first protrusion 123 of magnet 120.

With this configuration, the movement of magnet 120 in the rotating direction of rotating shaft 110 can be restricted.

That is, rotation of magnet 120 surrounding first sleeve 131 of spacer 130 can be suppressed. Thus, magnet 120 and spacer 130 can be fixed more reliably.

With this configuration, heat generated by magnet 120 is readily transferred to partition walls 135 which are heat dissipation fins. Therefore, reduction in the magnetic flux of magnet 120 by heat can further be suppressed.

Exemplary Modifications

Although the rotor and the electric motor according to the present disclosure have been described above based on the exemplary embodiment, the present disclosure is not limited to the exemplary embodiment.

For example, in the above exemplary embodiment, first recesses 136 are provided in flange 132 and first protrusions 123 are provided on magnet 120, and first recesses 136 fit on first protrusions 123. However, the present invention is not limited to this configuration. Specifically, it may be configured that a second protrusion is provided on first face 132a of flange 132 instead of first recess 136 of flange 132 and a second recess is provided in end face 121a of third end portion 121 of magnet 120 instead of first protrusion 123 of magnet 120, and the second protrusion of flange 132 fits in the second recess of magnet 120. Also in this case, rotation of magnet 120 can be suppressed.

In the above exemplary embodiment, the number of magnetic poles of rotor 10 is six. However, the present invention is not limited to this configuration. For example, the number of magnetic poles of rotor 10 may take any number of 2n (n is a natural number).

In the exemplary embodiment, electric motor 1 is used as a motor for driving a rotary brush mounted on a nozzle head of a vacuum cleaner. However, the present invention is not limited to this configuration. For example, electric motor 1 may be used as a fan motor of an electric blower mounted on a vacuum cleaner. In this case, a rotary fan is attached to rotating shaft 110 of electric motor 1 as a load. Electric motor 1 may be used not only for a vacuum cleaner but also for various electric devices such as a household electric device other than a vacuum cleaner such as an air conditioner and a refrigerator, a device for automobile, and an industrial electric device such as a robot.

The technology of the present disclosure can be widely used for an electric motor including a rotor, an electric device including an electric motor, and the like.

REFERENCE MARKS IN THE DRAWINGS

1: electric motor
10: rotor
20: stator
31: first bearing
32: second bearing
41: first bracket
42: second bracket
110: rotating shaft
111: first section
112: second section
120: magnet
120a: through hole
120b: inner circumferential surface
121: third end portion
121a: end face
122: fourth end portion
123: first protrusion
130: spacer
131: first sleeve
131a: through hole
131b: hook part
131c: large diameter part
131d: slit
131e: extension part
131f: inner circumferential surface
132: flange
132a: first face
132b: second face
133: second sleeve
133a: through hole
134: space
135: partition wall
136: first recess
137: first end portion
138: second end portion
210: stator core
211: teeth
220: winding coil
230: insulator

The invention claimed is:

1. A rotor comprising:
a rotating shaft including an axis as a rotation center;
a magnet having a cylindrical shape and disposed to surround the rotating shaft; and
a spacer that is disposed between the rotating shaft and the magnet, includes a sleeve extending from a first end portion to a second end portion along the axis, and fixes the magnet to the rotating shaft via the sleeve,
wherein:
the spacer further includes a flange extending from the sleeve in a radial direction of the rotating shaft,
the flange supports a third end portion of the magnet, the third end portion being on a side to the first end portion, and
the sleeve is provided with a plurality of slits extending from the second end portion toward the flange along a direction of the axis of the rotating shaft.

2. The rotor according to claim 1, wherein the rotating shaft, the magnet, and the spacer are integrally fixed by the rotating shaft inserted in the sleeve.

3. The rotor according to claim 1, wherein
the rotating shaft is press-fitted to face an inner circumferential surface of the sleeve, and
before the rotating shaft is press-fitted in the inner circumferential surface, a relationship of d1>d2 is satisfied, where d1 is an inner diameter of the first end portion of the sleeve and d2 is an inner diameter of the second end portion of the sleeve.

4. The rotor according to claim 1, wherein a space is provided at a boundary between the sleeve and the flange.

5. The rotor according to claim 1, wherein
the flange includes a first recess or a first protrusion provided to a face that is brought into contact with the magnet, and
the magnet includes a second protrusion that fits in the first recess or a second recess that fits on the first protrusion, the second protrusion or the second recess being provided to a face that is brought into contact with the flange.

6. The rotor according to claim 1, wherein the spacer is made of a material having higher thermal conductivity than the rotating shaft and the magnet.

7. A rotor comprising:
a rotating shaft including an axis as a rotation center;
a magnet having a cylindrical shape and disposed to surround the rotating shaft; and
a spacer that is disposed between the rotating shaft and the magnet, includes a sleeve extending from a first end portion to a second end portion along the axis, and fixes the magnet to the rotating shaft via the sleeve, wherein:
the spacer further includes a flange extending from the sleeve in a radial direction of the rotating shaft,
the flange supports a third end portion of the magnet, the third end portion being on a side to the first end portion,
the flange includes a first recess or a first protrusion provided to a face that is brought into contact with the magnet,
the magnet includes a second protrusion that fits in the first recess or a second recess that fits on the first protrusion, the second protrusion or the second recess being provided to a face that is brought into contact with the flange,
the spacer is provided with a plurality of partition walls extending in the radial direction of the rotating shaft on a face opposite to the face that is brought into contact with the magnet, and
the first recess or the first protrusion provided to the flange is positioned to overlap a corresponding one of the plurality of partition walls when viewed along the direction of the axis of the rotating shaft.

8. A rotor comprising:
a rotating shaft including an axis as a rotation center;
a magnet having a cylindrical shape and disposed to surround the rotating shaft; and
a spacer that is disposed between the rotating shaft and the magnet, includes a sleeve extending from a first end portion to a second end portion along the axis, and fixes the magnet to the rotating shaft via the sleeve, wherein:
the spacer further includes a flange extending from the sleeve in a radial direction of the rotating shaft,
the flange supports a third end portion of the magnet, the third end portion being on a side to the first end portion,
the magnet is a rare earth magnet, and
a plurality of partition walls extending in the radial direction of the rotating shaft are provided on a face of the flange, the face being on a side opposite to the face that is brought into contact with the magnet.

9. An electric motor comprising:
the rotor according to claim 1; and
a stator that faces the rotor.

10. An electric motor comprising:
the rotor according to claim 7; and
a stator that faces the rotor.

11. An electric motor comprising:
the rotor according to claim 8; and
a stator that faces the rotor.

* * * * *